(12) United States Patent
Gabler et al.

(10) Patent No.: US 9,376,256 B2
(45) Date of Patent: Jun. 28, 2016

(54) TRAY SEALER WITH EXCHANGEABLE BELT BODY

(71) Applicant: Multivac Sepp Haggenmüller GmbH & Co. KG, Wolfertschwenden (DE)

(72) Inventors: Albert Gabler, Wolfertschwenden (DE); Wolfgang Negele, Ottobeuren (DE); David Kelly, Obergünzburg (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 14/490,252

(22) Filed: Sep. 18, 2014

(65) Prior Publication Data

US 2015/0083553 A1    Mar. 26, 2015

(30) Foreign Application Priority Data

Sep. 20, 2013   (EP) .................................... 13185373

(51) Int. Cl.

| | |
|---|---|
| *B65G 21/06* | (2006.01) |
| *B65G 21/10* | (2006.01) |
| *B65G 23/22* | (2006.01) |
| *B65G 15/28* | (2006.01) |
| *B65B 59/04* | (2006.01) |
| *B65B 43/52* | (2006.01) |
| *B65B 7/16* | (2006.01) |
| *B65B 43/46* | (2006.01) |

(52) U.S. Cl.
CPC ................ *B65G 15/28* (2013.01); *B65B 7/164* (2013.01); *B65B 43/52* (2013.01); *B65B 59/04* (2013.01); *B65B 43/46* (2013.01); *Y10T 29/49721* (2015.01)

(58) Field of Classification Search
CPC ...................................................... B65G 21/06
USPC ............ 198/583, 584, 592, 617, 860.1, 861.5
See application file for complete search history.

(56) References Cited

U.S. PATENT DOCUMENTS

| | | | | |
|---|---|---|---|---|
| 3,127,978 | A * | 4/1964 | Zuercher ............... | B65G 21/14 198/812 |
| 3,878,937 | A * | 4/1975 | Glaser .................... | B65G 23/22 198/835 |
| 4,474,288 | A * | 10/1984 | Majewski .............. | B65G 21/06 186/68 |
| 4,769,970 | A * | 9/1988 | Konno .................. | B65B 13/183 100/14 |
| 5,096,045 | A * | 3/1992 | Feldl ...................... | B65G 15/24 198/583 |
| 5,150,781 | A * | 9/1992 | Deisenroth .......... | B65G 1/0478 198/349.8 |
| 5,609,238 | A * | 3/1997 | Christensen ........... | B65G 15/24 198/583 |

(Continued)

FOREIGN PATENT DOCUMENTS

| | | | | |
|---|---|---|---|---|
| DE | 102009004558 A1 | 7/2010 | | |
| EP | 1489007 A1 * | 12/2004 | ............. | B65B 13/06 |

(Continued)

*Primary Examiner* — Douglas Hess
(74) *Attorney, Agent, or Firm* — Husch Blackwell LLP

(57) ABSTRACT

The invention relates to a tray sealer having a feed belt comprising a drive unit and a belt body having a conveyor belt. The belt body is adapted to be dismounted, together with the conveyor belt, from the drive unit without making use of a tool. An exchange unit is provided on or at the tray sealer, the exchange unit being configured for accommodating the belt body when the belt body is dismounted from the drive unit. A corresponding method for exchanging or cleaning at least one of a conveyor belt, a belt body and/or a drive unit of a tray sealer is also provided.

13 Claims, 4 Drawing Sheets

(56) References Cited

U.S. PATENT DOCUMENTS

| | | | |
|---|---|---|---|
| 5,964,340 A | 10/1999 | Dolan | |
| 6,281,478 B2* | 8/2001 | Chandler | 198/586 |
| 6,705,433 B2* | 3/2004 | McQuaid | A47F 9/04 186/68 |
| 6,955,119 B2* | 10/2005 | Bobren | B65B 13/18 100/18 |
| 7,308,979 B1* | 12/2007 | Layne | B65G 17/08 198/600 |
| 7,360,645 B2* | 4/2008 | Pogu | H05K 13/021 198/861.1 |
| 7,383,765 B2* | 6/2008 | Kirar | B65B 13/06 100/18 |
| 8,413,574 B2* | 4/2013 | Oehm | B65B 13/06 100/2 |

FOREIGN PATENT DOCUMENTS

| | | |
|---|---|---|
| JP | 2003048613 A | 2/2003 |
| WO | 2007107703 A1 | 9/2007 |

\* cited by examiner

TRAY SEALER WITH EXCHANGEABLE BELT BODY

CROSS-REFERENCE TO RELATED APPLICATIONS

This Application claims priority to European Patent Application Number 13185373.1 filed Sep. 20, 2013, to Albert Gabler, Wolfgang Negele and David Kelly entitled "Tray Sealer with Exchangeable Belt Body," currently pending, the entire disclosure of which is incorporated herein by reference.

FIELD OF THE INVENTION

The present invention relates to a tray sealer and a method of exchanging and/or cleaning at least one of a conveyor belt, a belt body and/or a drive unit of a tray sealer.

BACKGROUND OF THE INVENTION

DE 10 2009 004 558 A1 discloses a tray sealer with pivotable belt bodies so that a conveyor belt can be removed from and cleaned and/or exchanged outside of the machine. Cleaning of the components of the pivotable belt body and of the statically arranged drive unit takes place in the tray sealer. The conveyor belt is driven by means of a drive shaft on the side on which the trays are conveyed.

SUMMARY OF THE INVENTION

It is the object of one embodiment of the present invention to provide a tray sealer which allows a conveyor belt to be driven on the side that does not face the product and which provides an improved cleanability of the conveyor belt, the belt body and the drive unit.

The tray sealer according to one embodiment the present invention comprises at least one belt body with a conveyor belt for conveying trays and a drive unit, and it is characterized in that the belt body is transferrable to an exchange unit, which is provided on or at the tray sealer. This has the advantage that, when the belt body has been removed together with the conveyor belt, the drive unit is easily accessible in the tray sealer for the purpose of cleaning without being partially concealed by the belt body. The belt body itself is very easily accessible in the exchange unit and can easily be cleaned when the conveyor belt has been removed from the belt body. It is also possible to clean the belt body and the conveyor belt in common in the exchange unit.

The phrase "on or at the tray sealer" means that the exchange unit may be provided directly on the tray sealer or may be connected thereto, or that it is provided on or connected to a component that is functionally integrated in the production process of the tray sealer, such as a feed belt for the tray sealer. The demand that the exchange unit should be "configured for accommodating the belt body" means that the shape of the exchange unit is, for example, configured such that the belt body can be supported reliably and stably at its exchange position.

According to one embodiment, the exchange unit is provided for accommodating (receiving) at least two belt bodies. The exchange unit may comprise at least one bracket, which is configured for accommodating at least one belt body. Thus, also a plurality of belt bodies present in the tray sealer can simultaneously be transferred to the exchange unit and accommodated in the bracket(s) for the purpose of cleaning or for an exchange of conveyor belts.

The bracket can be a one-piece component, especially a component made of a steel sheet and configured as a bent and/or stamped part.

The belt body may be adapted to be dismounted, together with the conveyor belt, from the drive unit without making use of a tool, so that this unit can be removed from the tray sealer and transferred to the exchange unit without great effort. Downtimes for cleaning, maintenance or changeover operations are reduced in this way.

According to one embodiment, the conveyor belt is adapted to be driven on its inner side by means of the drive unit and a drive shaft, so as to reduce the influence of contamination through the, for example, pasty or liquid product residues on the outer or upper side of the conveyor belt. The cleaning cycles are thus extended and downtimes of the tray sealer are reduced. The belt body may comprise the drive shaft, which may be releasably coupled to the drive unit, so as to allow an easy exchange or the removal of the belt body.

According to a further embodiment of the present invention, the belt body is adapted to be supported in the drive unit with a first side thereof and, on a second side thereof located opposite to said first side, it is adapted to be secured in position on the drive unit by means of locking devices without making use of a tool, so as to allow a simple structural design of the belt body and of the drive unit.

The exchange unit can be provided at a feed device arranged upstream of a feed belt of the tray sealer when seen in the production direction, since, in comparison with the tray sealer, more space is there available on an operating side of the packaging plant, and, for example, paths between two neighboring packaging plants are not limited by the exchange unit.

The method according to one embodiment of the present invention used for exchanging or cleaning the conveyor belt and/or the belt body and/or the drive unit of the tray sealer is characterized in that the conveyor belt is transferred, together with the belt body, from an operating position to the exchange unit provided on or at the tray sealer, and that the conveyor belt is there removed from the belt body so as to clean the conveyor belt and the belt body or exchange the conveyor belt.

According to one embodiment, the belt body is decoupled from the drive unit, without making use of a tool, from its operating position in the tray sealer, so as to allow fast cleaning as well as a good accessibility of the drive unit, the belt body and the conveyor belt.

The belt body may be accommodated in the bracket of the exchange unit such that the conveyor belt can be removed from the belt body. It is also imaginable that the exchange unit comprises at least one reception means for the conveyor belt itself for the purpose of cleaning. The conveyor belt may be configured, for example, as a belt, a link chain conveyor, a plurality of single belts, in particular toothed belts, or the like.

Other and further objects of the invention, together with the features of novelty appurtenant thereto, will appear in the course of the following description.

DESCRIPTION OF THE SEVERAL VIEWS OF THE DRAWING

In the following, an advantageous embodiment of the invention will be explained in more detail making reference to a drawing, in which the individual figures show.

Identical components are provided with identical reference numerals in all the figures.

DETAILED DESCRIPTION OF THE INVENTION

Figure 1:
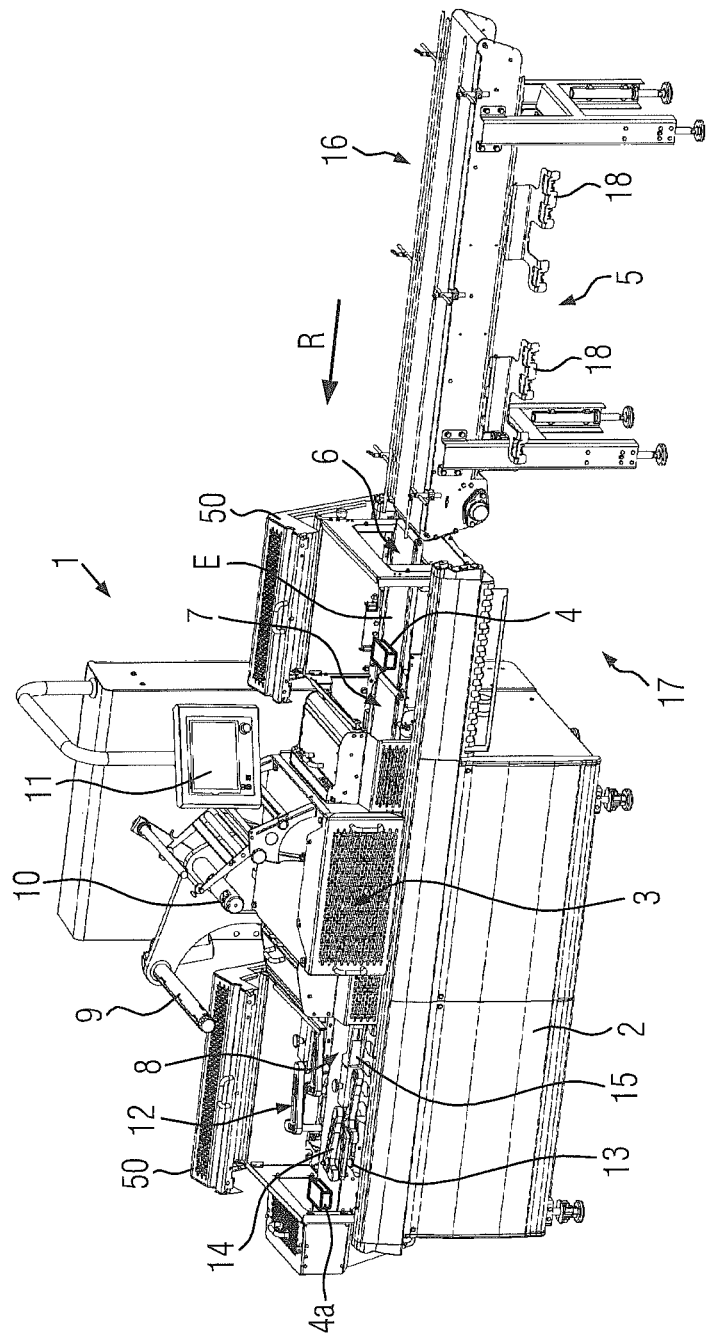
FIG. 1 is a side perspective view of a tray sealer with open protective covers and a feed device in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a perspective view of a tray sealer 1 according to one embodiment of the present invention with protective covers 50 open. The tray sealer 1 can be provided with a machine frame 2 having arranged thereon a closure device 3 (e.g., a sealing station) for closing and, optionally, sealing and/or evacuating and/or gas flushing of the respective trays 4 fed. The tray sealer 1 may additionally be provided with a feed belt 6 and a collecting belt 7 for feeding the trays 4 filled with the product in question, a discharge belt 8 for transporting the closed trays 4a away and a residual film winder 9 for winding up the film web of the cover film, the so-called residual film grid, that remains after sealing. The cover film, which is not shown in detail, is received on and unwound from a film supply reel 10. A display 11 enables the operator of the tray sealer 1 to check and control the operation of the tray sealer 1. A gripper system 12 comprises a transfer carriage 13, a pivoting device 14 and two gripper arms 15. The movement of the gripper system 12 in and opposite to a production direction R is executed for introducing non-closed trays 4 from the collecting belt 7 into the closure device 3 and for removing closed trays 4a from the closure device 3 and transferring them onto the discharge belt 8. The conveying surfaces of the belts 6, 7, 8 for trays 4, 4a define a horizontal conveying plane E.

As shown in FIG. 1, a feed device 16 is arranged upstream of the tray sealer 1, when seen in the production direction R, the feed device 16 being suitable for feeding the trays 4 filled with a product to the tray sealer 1 at arbitrary distances from one another. On a side of the feed device 16 corresponding to the side 17 from which the tray sealer 1 is operated, an exchange unit 5 in the form of two brackets 18 may be provided, each of the brackets 18 being formed in one piece and adapted to receive thereon a belt body 21 (cf. FIG. 3).

Figure 2:
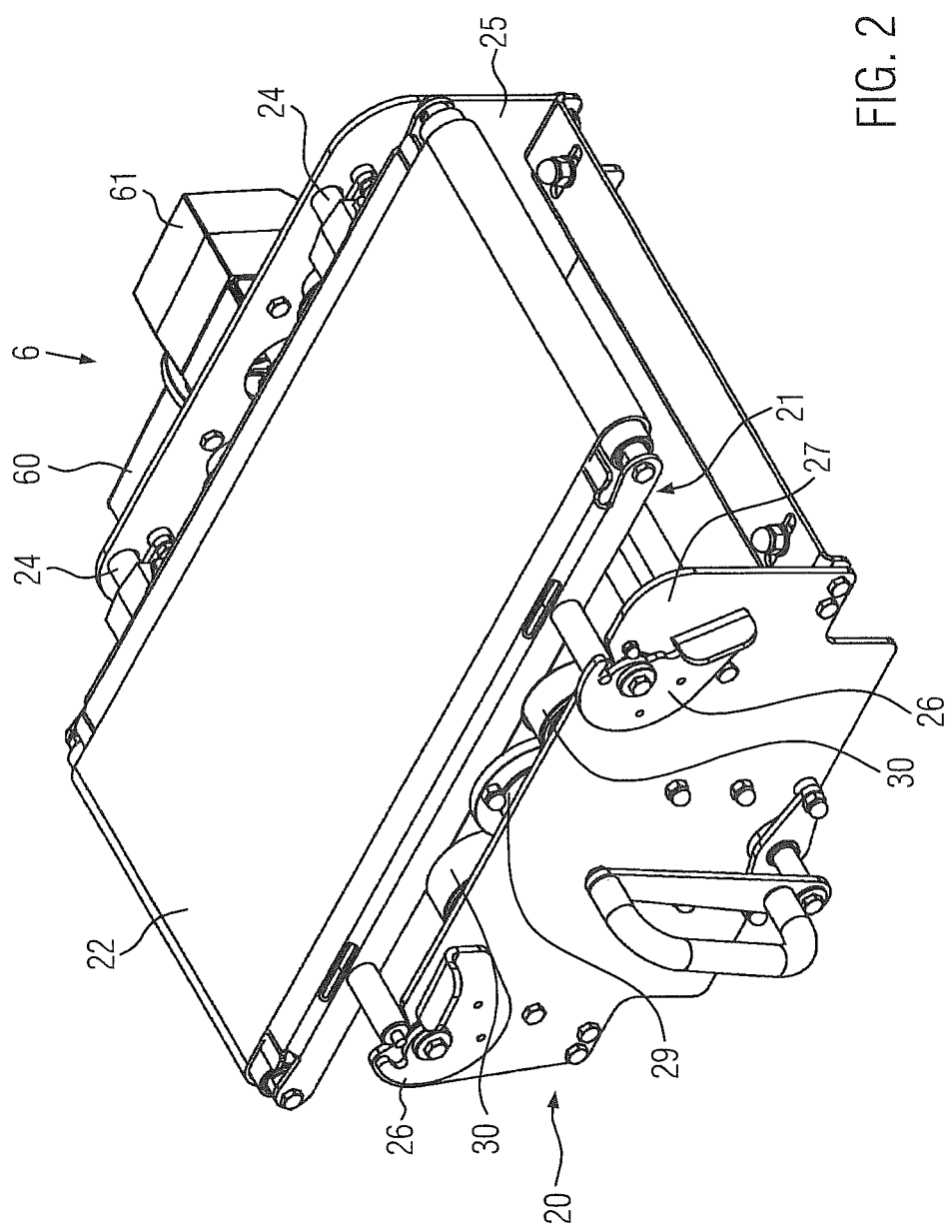
FIG. 2 is a top perspective view of a drive unit with a belt body and conveyor belt at an operating position in accordance with one embodiment of the present invention.

FIG. 2 shows the feed belt 6 comprising a drive unit 20, a belt body 21 and a conveyor belt 22. As demonstrated, the belt body 21 is supported on a back wall 25 of the drive unit 20 by means of two axles 24 on a first side thereof (located further to the rear in the plane of the drawing) and, with a second side thereof (located further to the front in the plane of the drawing). The belt body 21 can be locked to and dismounted from a front wall 27 of the drive unit 20 via the two axles 24, without making use of a wrench, by means of two locking devices 26 in the form of rotatable levers. In FIG. 2, the locking device 26 shown on the right of the drawing is depicted at a locked position and the locking device 26 shown on the left of the drawing is depicted at an open position. A drive shaft 29 may be supported in the drive unit 20 via a clutch, which is not shown in detail. The drive shaft 29 can be driven via a servo motor 60 and a gear unit 61.

Figure 3:
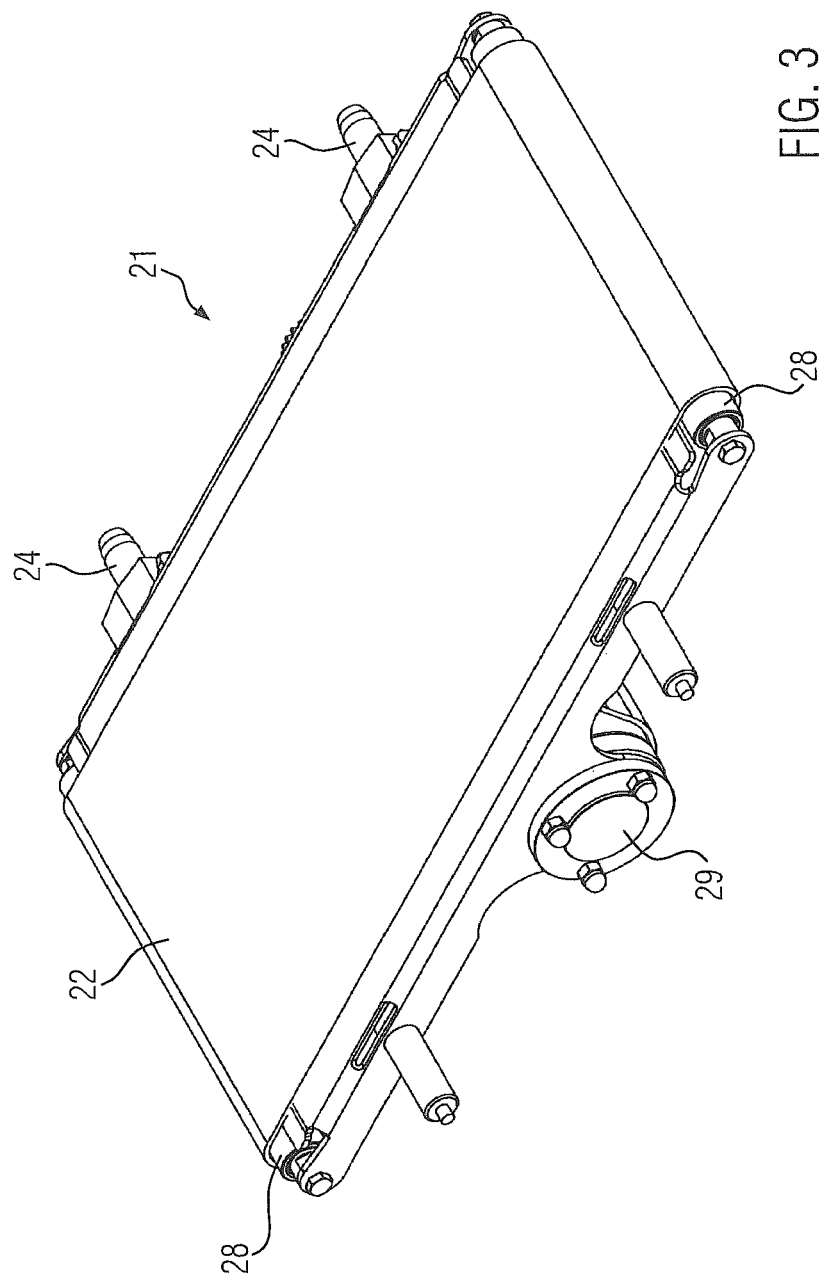
FIG. 3 is a top perspective view of a belt body and conveyor belt of FIG. 2.

FIG. 3 shows the belt body 21 in a condition in which it has been removed from the drive unit 20. The belt body 21 may comprise two pulleys 28 arranged at the beginning and at the end as well as a drive shaft 29 located therebetween, the drive shaft 29 driving the conveyor belt 22 in that the inner side of said conveyor belt 22 partly abuts on the drive shaft 29 and extends therearound. The friction occurring between the drive shaft 29 and the conveyor belt 22 and required for driving the conveyor belt 22 can be generated by means of two pulleys 30 on the drive unit 20 (cf. FIG. 2) in the installed condition (i.e., at the operating position).

Figure 4:
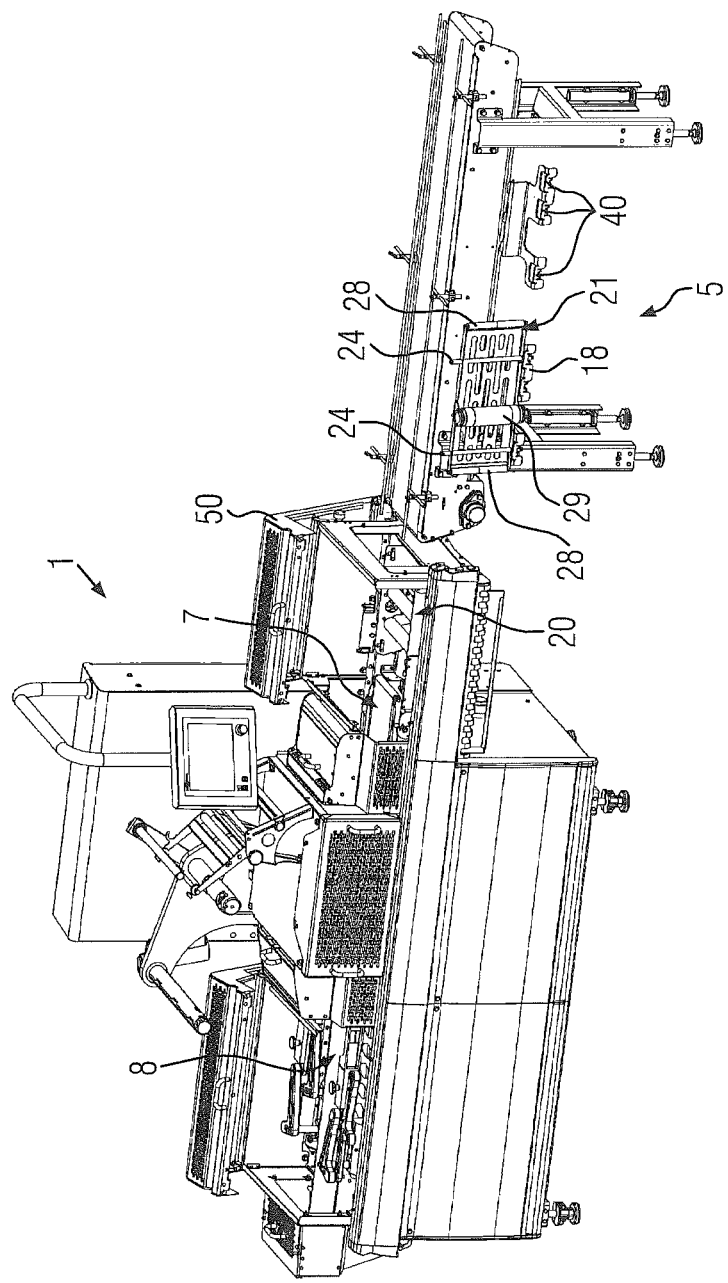
FIG. 4 is a side perspective view of a tray sealer of FIG. 1 illustrating the belt body in the exchange unit at a cleaning position.

FIG. 4 shows the belt body 21 of the feed belt 6 in the bracket 18 on the exchange unit 5 without the conveyor belt 22, which has already been removed from the belt body 21. Taking the feed belt 6 as an example, it can be seen in FIG. 4 that the drive unit 20 is easily accessible to the operator for the purpose of cleaning, with the protective covers 50 at their open position. This also applies to the collecting belt 7 and the discharge belt 8 in an analogous manner. The position of the belt body 21 in the bracket 18 is approximately upright or the orientation of the belt body 21 is slightly inclined, preferably by less than 30°, relative to a perpendicular to the conveying plane E. When, for example, water or detergents are used for cleaning, these liquids can therefore easily drain and product residues can be washed off easily. The drive shaft 29 and the pulleys 30 may be especially easily accessible. The bracket 18 itself is equally suitable for accommodating (receiving) the feed belt 6, the collecting belt 7 and the discharge belt 8, even if the various belts 6, 7, 8 have differently spaced axles 24, since the bracket 18 has three differently spaced positions 40 for accommodating the axles 24.

It is also imaginable to provide in the exchange unit 5 a separate bracket 18 for each individual belt 6, 7, 8, so as to accommodate a respective belt body 21 with a conveyor belt 22 for exchange.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A tray sealer comprising:
    a feed belt for conveying trays;
    said feed belt comprising a drive unit, a belt body, and a conveyor belt disposed for movement on said belt body;
    a feed device disposed upstream of said feed belt of said tray sealer in a production direction, said feed device for conveying trays to said tray sealer; and
    an exchange unit disposed on or proximate said tray sealer, said exchange unit being configured for supporting said belt body;
    wherein said belt body is moveable between a first position being mounted on and drivingly engaged with said drive unit and a second position being dismounted and disengaged from said drive unit and supported by said exchange unit.

2. The tray sealer according to claim 1, wherein said tray sealer includes at least two belts, each of said at least two belts including a belt body, and said exchange unit is configured for supporting at least two belt bodies.

3. The tray sealer according to claim 1, wherein said exchange unit comprises at least one bracket configured for supporting said belt body.

4. The tray sealer according to claim 3, wherein said bracket is a one-piece component.

5. The tray sealer according to claim 1, wherein said belt body is adapted to be dismounted, together with said conveyor belt, from said drive unit without making use of a tool.

6. The tray sealer according to claim 1, wherein said conveyor belt is driven on an inner side by said drive unit and a drive shaft.

7. The tray sealer according to claim 6, wherein said belt body comprises said drive shaft, said drive shaft being releasably coupled to said drive unit in said first position of said belt body.

8. The tray sealer according to claim 1, further comprising one or more locking devices, said locking devices disposed on said drive unit to support, position and lock said belt body in said drive unit without making use of a tool.

9. The tray sealer according to claim 1, wherein said exchange unit is disposed on said feed device.

10. The tray sealer according to claim 9, wherein said exchange unit comprises at least one bracket coupled to said feed device and at least one receptacle for receiving a portion of said belt body.

11. A method of exchanging or cleaning at least one of a conveyor belt, a belt body, and a drive unit of a tray sealer, said method comprising the steps of:
    transferring said conveyor belt with said belt body from an operating position to an exchange unit provided on or at said tray sealer;
    decoupling said belt body from said drive unit, without making use of a tool, when said drive unit is in an operating position in said tray sealer; and
    removing said conveyor belt from said belt body so as to clean at least one of said conveyor belt, said belt body and said drive unit, or exchange at least one of said conveyor belt and said belt body.

12. The method according to claim 11, wherein said belt body is accommodated in a bracket of said exchange unit such that said conveyor belt can be removed from said belt body.

13. The combination of a tray sealer and of a feed device comprising:
    the tray sealer comprising, a feed belt, a belt body with a conveyor belt for conveying trays, and a drive unit, and
    the feed device being arranged upstream in a production direction of said feed belt of said tray sealer;
    an exchange unit disposed on said feed device, said exchange unit being configured for accommodating the belt body;
    wherein the belt body is transferrable from said tray sealer to said exchange unit.

* * * * *